US010169305B2

(12) United States Patent
Indenbom et al.

(10) Patent No.: US 10,169,305 B2
(45) Date of Patent: Jan. 1, 2019

(54) MARKING COMPARISON FOR SIMILAR DOCUMENTS

(71) Applicant: ABBYY Development LLC, Moscow (RU)

(72) Inventors: Evgeny Indenbom, Moscow (RU); Sergey Kolotienko, Rostov-na-Donu (RU)

(73) Assignee: ABBYY Development LLC, Moscow (RU)

( * ) Notice: Subject to any disclaimer, the term of this patent is extended or adjusted under 35 U.S.C. 154(b) by 0 days.

(21) Appl. No.: 15/625,889

(22) Filed: Jun. 16, 2017

(65) Prior Publication Data

US 2018/0349332 A1 Dec. 6, 2018

(30) Foreign Application Priority Data

May 30, 2017 (RU) ................................ 2017118753

(51) Int. Cl.
*G06F 17/21* (2006.01)
*G06F 17/22* (2006.01)

(52) U.S. Cl.
CPC ........ *G06F 17/2211* (2013.01); *G06F 17/218* (2013.01)

(58) Field of Classification Search
CPC combination set(s) only.
See application file for complete search history.

(56) References Cited

U.S. PATENT DOCUMENTS

| 7,783,642 | B1 | 8/2010 | Feng et al. |
| 7,958,136 | B1* | 6/2011 | Curtis ............... G06F 17/30616 707/705 |
| 8,200,487 | B2 | 6/2012 | Peters et al. |
| 8,332,221 | B2 | 12/2012 | Peters et al. |
| 8,370,390 | B1* | 2/2013 | Permakoff .......... G06F 17/3069 707/786 |
| 8,620,836 | B2 | 12/2013 | Ghani et al. |
| 8,688,448 | B2 | 4/2014 | Peters et al. |
| 8,732,181 | B2* | 5/2014 | Massand ............... G06F 17/301 707/758 |
| 8,805,840 | B1 | 8/2014 | Joshi et al. |

(Continued)

FOREIGN PATENT DOCUMENTS

WO 2003017251 A1 2/2003

*Primary Examiner* — Asher D Kells

(74) *Attorney, Agent, or Firm* — Lowenstein Sandler LLP

(57) ABSTRACT

A document marking projection system receives a target document comprising text content, determines a set of similar documents using an index of stored documents, where the set of similar documents are similar to the target document, and selects a first similar document from the set of similar documents that is most similar to the target document. The document marking projection system determines one or more portions of text content in the first similar document that are different from respective one or more portions of text content in the target document, determines a first location of a first marking within the first similar document, determines a projected marking for the target document in view of one or more differences between the first portion of the text content in the first similar document and a respective portion of the text content in the target document, and stores the projected marking for the target document.

30 Claims, 8 Drawing Sheets

(56) References Cited

U.S. PATENT DOCUMENTS

| | | | |
|---|---|---|---|
| 8,825,628 B2 | 9/2014 | Feng et al. | |
| 8,843,493 B1* | 9/2014 | Liao | G06F 17/30985 |
| | | | 707/737 |
| 9,128,906 B2 | 9/2015 | Peters et al. | |
| 2005/0010863 A1* | 1/2005 | Zernik | G06F 17/2211 |
| | | | 715/229 |
| 2007/0022072 A1* | 1/2007 | Kao | G06F 17/2211 |
| | | | 706/45 |
| 2010/0312728 A1 | 12/2010 | Feng et al. | |
| 2011/0087701 A1* | 4/2011 | Eyres | G06F 17/30011 |
| | | | 707/780 |
| 2012/0060082 A1* | 3/2012 | Edala | G06F 17/241 |
| | | | 715/231 |
| 2014/0101526 A1* | 4/2014 | Marsh | G06F 17/2211 |
| | | | 715/229 |
| 2014/0115436 A1* | 4/2014 | Beaver | G06F 17/2288 |
| | | | 715/229 |
| 2015/0370757 A1* | 12/2015 | Duns | G06F 17/212 |
| | | | 715/229 |
| 2016/0055196 A1* | 2/2016 | Collins | G06F 17/2211 |
| | | | 707/690 |
| 2017/0109326 A1* | 4/2017 | Tan | G06F 17/218 |
| 2017/0161246 A1* | 6/2017 | Klima | G06F 17/241 |
| 2018/0107633 A1* | 4/2018 | Salisbury | G06F 17/2211 |

\* cited by examiner

TARGET DOCUMENT 200

THIS LEASE AGREEMENT is made as of the 12th of December, 2010, by and between John Doe, a single man, whose mailing address is 515 Main St., Palo Alto, CA 94301, as Lessor(s), and ABC, INC., 1000 Elm St., Suite 1500, Palo Alto, CA 94301, as Lessee. All printed portions of this lease were prepared by the party hereinabove named as Lessee, but all other provisions including the completion of blank spaces, were prepared jointly by Lessor and Lessee.

Fig. 2A

MARKING COMPARISON FOR SIMILAR DOCUMENTS

CROSS REFERENCE TO RELATED APPLICATIONS

This application claims the benefit of priority to Russian patent application No. 2017118753, filed May 30, 2017; which is hereby incorporated by reference herein.

TECHNICAL FIELD

The present disclosure is generally related to computer systems, and is more specifically related to systems and methods for extracting information from natural language text documents.

BACKGROUND

Information extraction is one of the important operations in automated processing of natural language texts. Extracting information from natural language texts, however, can be complicated by ambiguity, which is a characteristic of natural languages. This, in turn, can require significant resources in order to extract information accurately and in a timely manner. Information extraction can be optimized by implementing extraction rules that identify specific information within those documents.

SUMMARY OF THE DISCLOSURE

Embodiments of the present disclosure describe generating markings within a document based on the markings of similar documents. In accordance with one or more aspects of the present disclosure, an example method for a document marking projection system receives a target document comprising text content, determines a set of similar documents using an index of stored documents, where the set of similar documents are similar to the target document, and selects a first similar document from the set of similar documents that is the most similar to the target document in view of a corresponding similarity measurement. The document marking projection system determines one or more differences between text content of the target document and text content of the first similar document, determines a first location of a first marking within the first similar document, determines a projected marking for the target document in view of the one or more differences between the text content of the target document and the text content of the first similar document, and stores the projected marking for the target document.

In accordance with one or more aspects of the present disclosure, an example system for a document marking projection system may comprise a memory to store instructions, and a processing device operatively coupled to the memory, where the processing device is to: receive a target document comprising text content, determine a set of similar documents using an index of stored documents, where the set of similar documents are similar to the target document, and select a first similar document from the set of similar documents that is the most similar to the target document in view of a corresponding similarity measurement. The processing device determines one or more differences between text content of the target document and text content of the first similar document, determines a first location of a first marking within the first similar document, determines a projected marking for the target document in view of the one or more differences between the text content of the target document and the text content of the first similar document, and stores the projected marking for the target document.

In accordance with one or more aspects of the present disclosure, an example computer-readable non-transitory storage medium may comprise executable instructions that, when executed by a computing device, cause the computing device to: receive a target document comprising text content, determine a set of similar documents using an index of stored documents, where the set of similar documents are similar to the target document, and select a first similar document from the set of similar documents that is the most similar to the target document in view of a corresponding similarity measurement. The processing device determines one or more differences between text content of the target document and text content of the first similar document, determines a first location of a first marking within the first similar document, determines a projected marking for the target document in view of the one or more differences between the text content of the target document and the text content of the first similar document, and stores the projected marking for the target document.

BRIEF DESCRIPTION OF THE DRAWINGS

The present disclosure is illustrated by way of example, and not by way of limitation, and can be more fully understood with reference to the following detailed description when considered in connection with the figures in which:

FIG. 2A depicts an example of a target document, in accordance with one or more aspects of the present disclosure.

DETAILED DESCRIPTION

Figure 1:
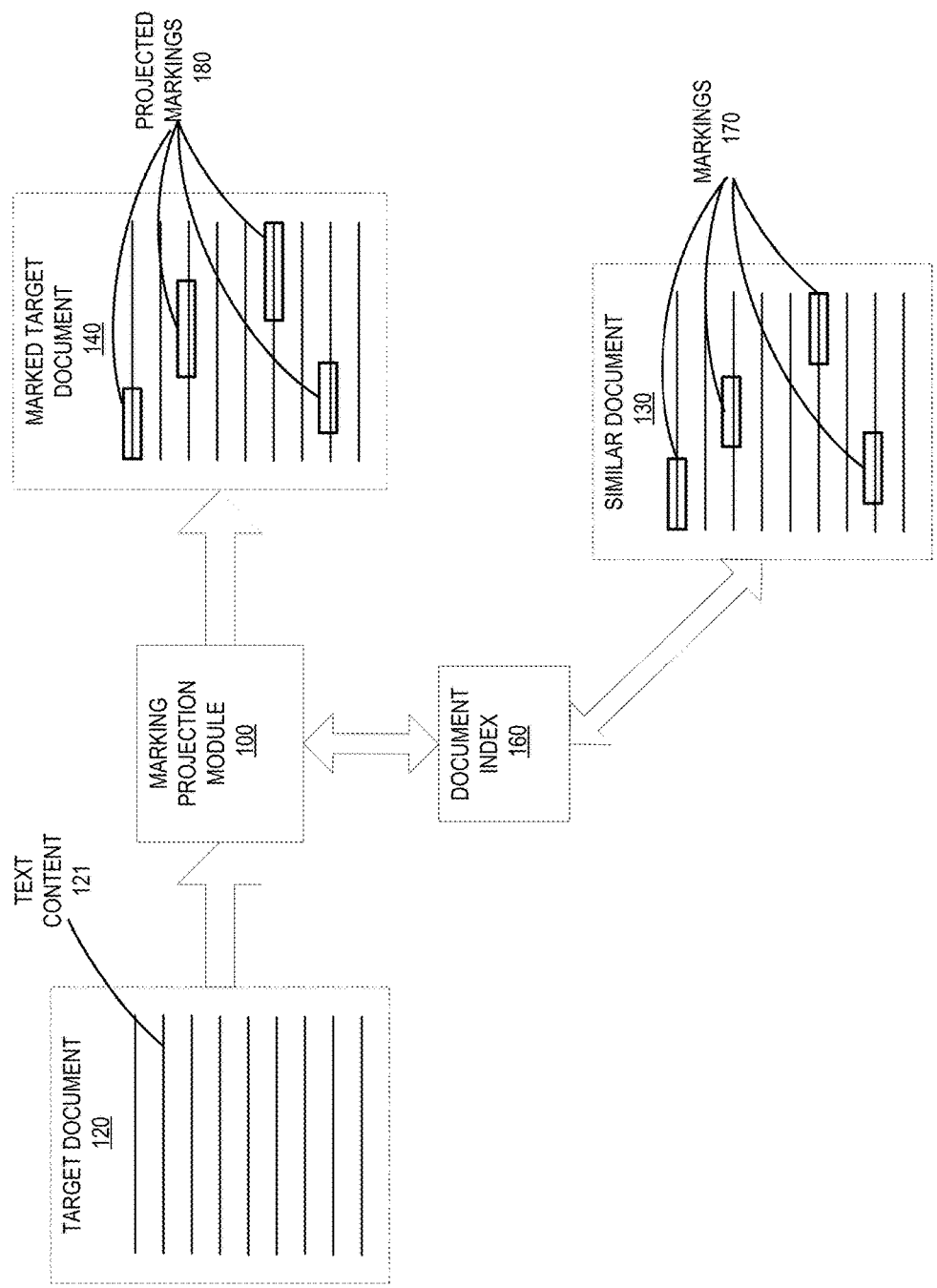
FIG. 1 depicts a high-level diagram of an example marking projection system, in accordance with one or more aspects of the present disclosure.

Described herein are methods and systems for document marking projection using analysis of similar documents. Data extraction can be optimized by the implementation of extraction rules. This type of optimization, however, can be limited since different types of documents may be associated with different rules. Thus, implementing a single set of rules across multiple document types may not produce significant benefits. Similarly, implementing different sets of rules for different document types can involve expensive operations to determine a document type before being able to select a particular extraction rule. In some implementations, documents may include "markings" that label or otherwise identify particular areas of text within the documents for extraction. While the use of markings can reduce the amount of processing used for data extraction and thereby shorten processing time, identifying fragments of text to be marked and marking text can often involve significant manual effort.

Aspects of the present disclosure address the above noted and other deficiencies by employing natural language processing mechanisms to generate markings for a target document based on an analysis of documents that are similar to the target document. Thus, markings associated with the similar document(s) may be "projected" from the similar document into the target document based on an analysis of the points of mismatch between the documents. Documents are considered to be similar if they share a similar structure, share a particular percentage of similar words, share a particular percentage of similar characters, or the like. In various implementations, document similarity may be determined by applying semantic analysis, syntactic analysis, structural comparison, contextual comparison, or in any other manner (e.g., similarity methods such as w-shingling, n-gram, k-mer, MinHash, Bag-of-words, or the like).

In an illustrative example, a document marking projection system receives a natural language target document that does not include any markings. A natural language target document refers to a document that includes text content (e.g., a text document, a word processing document, a document that has undergone optical character recognition (OCR)). The document marking projection system may then access an index of documents to identify documents that are similar to the target document. The document marking projection system may then compare the most similar documents to the target to identify any differences between the documents, and use the identified differences to facilitate the generation of markings for the target document. The positions of any markings in the similar document when combined with the positions of differences between the documents can then be used to identify a location for a corresponding marking in the target document.

Aspects of the present disclosure are thus capable of more efficiently identifying meaningful content for a target text document with little to no manual intervention. By identifying similar documents that already include marking information, the processing required to generate markings for new target documents can be substantially reduced.

FIG. 1 depicts a high-level component diagram of an example document marking projection system in accordance with one or more aspects of the present disclosure. The document marking projection system may include a marking projection module 100 and document index 160. The marking projection module 100 may be a client-based application or may be a combination of a client component and a server component. In some implementations, the marking projection module 100 may execute entirely on the client computing device such as a tablet computer, a smart phone, a notebook computer, a camera, a video camera, or the like. Alternatively, a client component of the marking projection module 100 executing on a client computing device may receive a document and transmit it to a server component of the marking projection module 100 executing on a server device that performs the document marking projection. The server component of the marking projection module 100 may then return a marked document to the client component of the marking projection module 100 executing on the client computing device for storage or display to a user. In other implementations, marking projection module 100 may execute on a server device as an Internet-enabled application accessible via a browser interface. The server device may be represented by one or more computer systems such as one or more server machines, workstations, mainframe machines, personal computers (PCs), etc.

In an illustrative example, marking projection module 100 may receive a target document 120 that includes natural language text content 121. In one embodiment, marking projection module 100 may receive the target document 120 via a text entry application, a pre-existing document that includes text content (e.g., an electronic document that includes text content such as a text document, a word processing document, a document that has undergone optical character recognition (OCR), a Portable Document Format (PDF) with a text layer, etc.), or in any similar manner. Alternatively, marking projection module 100 may receive an image of text (e.g., via a camera of a mobile device), subsequently performing optical character recognition (OCR) on the image. Marking projection module 100 may also receive an audio dictation from a user (e.g., via a microphone of the computing device) and convert the audio to text via a transcription application.

Marking projection module 100 may then generate projected document markings for the target document 120 based on document markings associated with documents that are similar to the target document 120. A document marking is a reference to a sequence of characters (e.g., a "span" of characters) within a natural language text document that describes the meaning of that sequence of characters. A marking may be used by document processing systems to extract the text associated with the marking. For example, for a legal agreement document, it may be useful to extract the names and addresses of the parties to the agreement, the pertinent facts and/or parameters of the agreement, or other similar information. A marking can be defined by its coordinate locations of these spans of text within the associated document (starting position, ending position, etc.) as well as its type or category (e.g., name, address, state, zip code, property location, etc.). In some implementations, a marking can be stored as metadata associated with the document. Alternatively, a marking may be defined as a form field location within the document (e.g., a PDF form field, a word processing document form field, etc.)

To generate the projected markings for the target document 120, marking projection module 100 may first determine documents that are similar to the target document 120. In some implementations, marking projection module 100 may make this determination by accessing a document index 160 that stores search indexing information for one or more documents that have associated markings. The document index 160 may be propagated with document information using a training process, where information associated with one or more documents are stored in the index 160. Each document that has associated information stored in index 160 may include its own markings, which may also be stored in the index. In some implementations, the index stores document text. Alternatively, the index stores document identifiers that refer to coordinate positions within the indexed documents so that text may be quickly identified.

In various embodiments, index 160 may be a table where each word (e.g., each lexeme or word form) in a document is associated with a list of identifiers or addresses of the occurrences of that word in the document. In some implementations, when morphological, syntactic, lexical, and/or semantic analysis is performed, index 160 may be generated to index the results of the analysis (e.g., the parameters generated as a result of the analysis). In some implementations, the index 160 may also include references to any markings included in a document. Index 160 may store the references to the markings in a similar fashion to that of words, characters, etc. In such cases, index 160 may store the references to the identifier of a marking (e.g., the title, name, descriptor tag) so that markings with similar identifiers may be located using the index 160. For example, if index 160 stores information for multiple lease documents that each include a marking for a "lessor", index 160 may be used to search the documents to find the names of the "lessors" in the lease documents using a search query.

In some implementations, marking projection module 100 may access the document index 160 directly. Alternatively, marking projection module 100 may invoke another system component or module (not pictured) that accesses the document index 160 to identify documents that are similar to the target document 120. Marking projection module 100 may determine document similarity by applying semantic analysis, syntactic analysis, structural comparison, contextual comparison, or in any other manner (e.g., similarity methods such as w-shingling, n-gram, k-mer, MinHash, Bag-of-words, or the like). In one embodiment, marking projection module 100 may determine a set of similar documents, where the set of similar documents are each similar to the target document 120, and where each similar document in the set has a corresponding similarity measurement. In another embodiment, the set of similar documents may be formed by using one or more classifiers or by a combination of classifiers.

A similarity measurement value may be a product of the process that identifies similar documents, and may be based on a percentage of similar words to the target document, a percentage of similar characters to the target document, or the like. In some implementations the similarity measure may be represented as a numerical value. For example, a similarity measurement of 0 may indicate that the document is not similar to the target document 120, and a similarity measurement of 1 may indicate that a document is an exact match to the target document. In other embodiments the similarity measurement may be represented as a range of numeric values from 0 to 10, a range of numeric values 0 to 100, a range of percentages, a range of alphabetic characters (A to Z), etc.

Marking projection module 100 may then select one or more most similar documents 130 from the set of similar documents to obtain those documents that are the "most similar" to the target document 120. In some implementations, marking projection module 100 may make this selection by sorting and/or filtering the set of similar documents obtained from the search of document index 160. In one embodiment, marking projection module 100 may sort the set of similar documents by their associated similarity measurement and select documents from the sorted list that meet a threshold value. For example, marking projection module 100 may select those documents where the similarity measurement is greater than 8 on a scale from 0 to 10. Additionally, marking projection module 100 may select the "most" similar document by identifying the document with a similarity measurement value that is greater than the corresponding similarity measurements for all other documents in the set of documents produced by the index. In another embodiment, the most similar documents may be selected by using one or more classifiers or by combination of classifiers. In still another embodiment, other heuristic methods, for example, pairwise comparison of documents may be used.

Marking projection module 100 may then begin the process of projecting the markings 170 of similar document 130 to the target document 120 by determining one or more differences between the text content of target document 120 and the text content of similar document 130. By determining the differences between the text content of target document 120 and the text content of similar document 130, marking projection module 100 can identify the locations of points of text match and text mismatch between the two. Since the documents have already been determined to be similar, the differences in the text content between the documents should not vary significantly beyond specific portions of text that may be likely to include document markings (e.g., names, addresses, locations, serial numbers, etc.). Thus, by determining the points of match and mismatch, marking project module can more efficiently identify the boundaries of portions of text in the target document 120 that correspond to text in similar document 130 that are included in markings 170.

In some implementations, marking projection module 100 may select two or more most similar documents for use in setting the projected marking. In such cases, the comparison process described above may be repeated for each selected document from the set of most similar documents. The projected markings for the target document may be determined using a "voting" process that takes into account locations of common points of text match and text mismatch across each of the most similar documents (e.g., the amount of "overlap" of text match and text mismatch between the target document and the most similar documents). In such cases, the projected marking for the target document may be determined based on a combination of several variants of corresponding markings from the similar documents, where each variant of the marking is a result of comparing one of the selected documents from the set of most similar documents with the target document. To determine starting and ending positions of the combined projected marking, a number of "votes" is calculated for each span of text in the target document that matches a corresponding span of text in the selected most similar documents. Thus, the number of votes may represent the number of most similar documents for which a particular span of text is located within a common interval. The spans having the number of votes of individual markings greater than a threshold value may be used to set the boundaries for the combined projected marking.

Marking projection module 100 may determine the differences by determining one or more portions of text content in one or more similar document 130 that are different from respective one or more portions of text content in target document 120. In some implementations, marking projection module 100 may determine the differences by comparing target document 120 to similar document 130 on a character by character basis. This process can thus determine the coordinates (or other location information) of the spans of text within each document that are different from each other. In other words, marking projection module 100 may determine any locations of points of text mismatch (and points of text match) between target document 120 and similar document 130.

Once the differences between the documents have been identified, marking projection module 100 may subsequently determine locations for markings 170 within similar document 130, where each of the markings 170 may be associated with a portion of the text content of similar document 170. Marking projection module 100 may then determine the projected markings 180 for target document 120 by analyzing the differences between the documents. The process may thus generate the projected markings 180 that correspond to the markings 170 of the similar document. In some implementations, the markings 180 are generated by determining coordinate locations of portions of text within the target documents 120 in relation to the points of mismatch for the target document 120 and the similar document 130 or a set of most similar documents. Aspects of this process are described in further detail below with respect to FIGS. 2A-2C.

Once the projected markings 180 have been determined for target document 120, marking projection module 100 may then store the markings 180 for the target document 120. As shown in FIG. 1, the resulting document may be stored as a new marked document 140 that contains the text content of target document 120 as well as the projected markings 180. In other embodiments, projected markings 180 may be stored with the original target document 120 rather than creating a new document. As described above, the projected markings 180 may be embedded in the document itself, or stored separately as metadata associated with the document. In some implementations, marked target document 140 and its corresponding projected markings 180 may then be indexed in document index 160 to be used with future document processing. For example, the marked target document 140 and its corresponding projected markings 180 may be incorporated into a training data set that may be used to further improve future marking projections. Notably, this provides additional efficiency, since manual document marking processing is conventionally very expensive.

In some implementations, marked target document 140 and its corresponding projected markings 180 may be provided as input to another system to facilitate data extraction based on the projected markings 180. In some implementations, a data extraction system may receive marked target document 140, identify the locations of projected markings 180, and extract the portions of text at those locations. The extracted text may then be used to propagate online forms, propagate database fields, or the like. For example, the projected markings 180 associated with a lease agreement can extract the specific details of the agreement and propagate them to a database. Additionally, the marked documents may be used by machine translation (MT) systems to translate the information included in the markings to other languages. Since markings in a document may typically identify named entities or other important content that should be translated to another language in a particular way, providing the markings to an MT system can facilitate more efficient translation. Thus, aspects of the present disclosure can provide a more efficient method of identifying important information in text documents for data extraction processing. Notably, marking projection module 100 can perform the marking projection processing as described above without employing the complex, deep semantic and syntactic analysis of text documents employed by conventional systems.

Although for simplicity, FIG. 1 depicts a single similar document 130, it should be noted that multiple similar documents 130 may be identified and used to generate the projected markings 180. In an illustrative example, marking projection module 100 may receive a target document that includes two paragraphs of text, and identify two similar documents—one similar document that is most similar to the first paragraph of the target document and another similar document that is most similar to the second paragraph of the target document. Marking projection module 100 may then use the markings of the first similar document to generate projected markings for the first paragraph of the target document. Similarly, marking projection module 100 may use the markings of the second similar document to generate projected markings for the second paragraph of the target document.

Figure 2B:
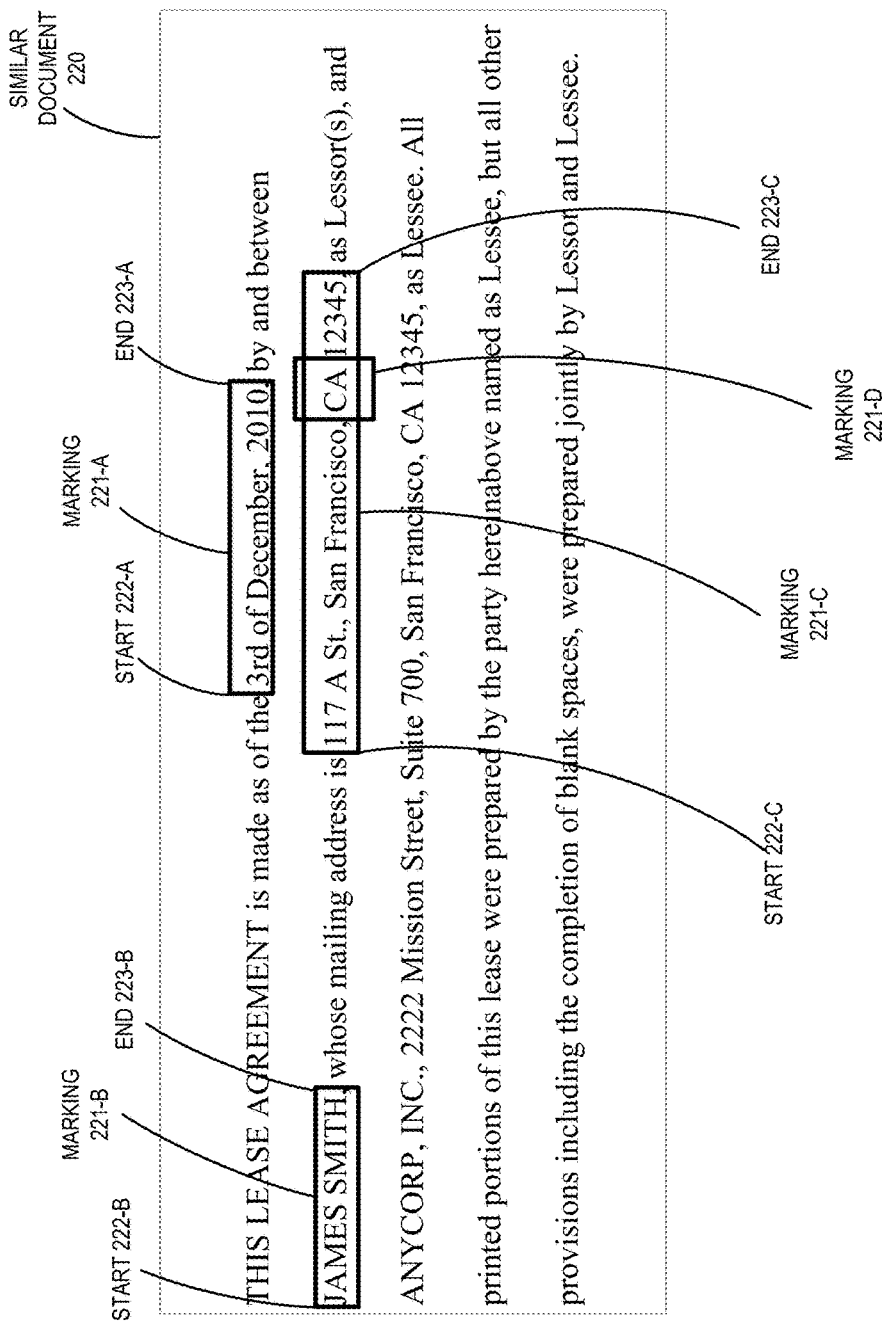
FIG. 2B depicts an example of a similar document that includes document markings, in accordance with one or more aspects of the present disclosure.
Figure 2C:
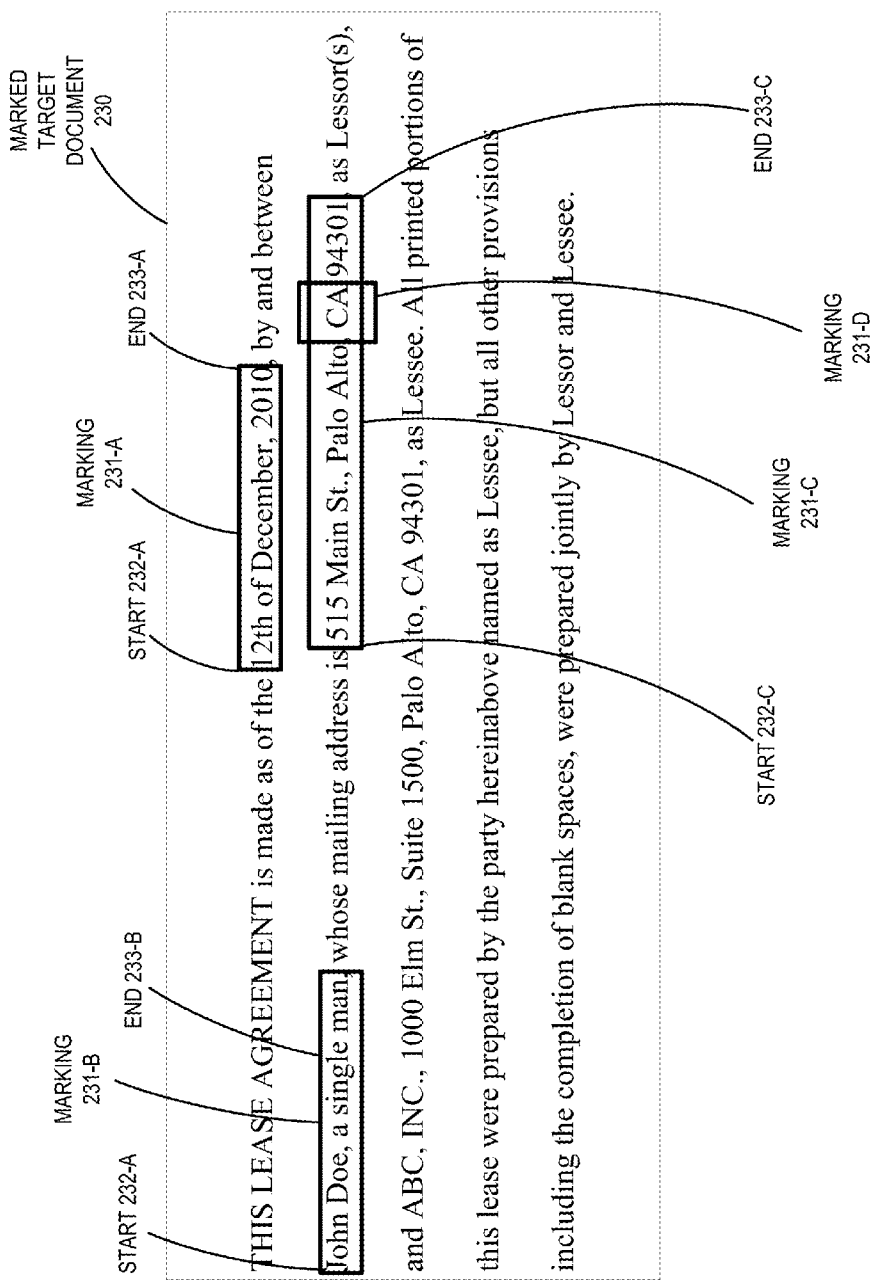
FIG. 2C depicts an example of a modified target document that includes markings based on the markings of the similar document of FIG. 2B, in accordance with one or more aspects of the present disclosure.

FIGS. 2A-2C illustrate an example of projecting markings for a target document based on the markings of an identified similar document as described above with respect to FIG. 1. Although for simplicity FIGS. 2A-2C depict a particular types of text documents and markings, it should be noted that other types of documents with other types of markings may be analyzed to generate projected markings for other types of text content. FIG. 2A depicts an example of a target document 200 that includes a portion of text content for a lease agreement between two parties. As shown in FIG. 2A, the lease agreement is dated 12 Dec. 2010 for a lease between "John Doe" and "ABC, INC.".

FIG. 2B depicts an example of a similar document 220 that includes a portion of text content for a similarly structured lease agreement between two parties, as well as markings associated with several spans of text within the agreement. As shown in FIG. 2B, the lease agreement is dated 3 Dec. 2010 for a lease between "JAMES SMITH" and "ANYCORP, INC." Similar document 220 includes markings 221-A, 221-B, 221-C, and 221-D. Marking 221-A is associated with the span of text content that includes the date of the lease agreement, with a starting position (start) 222-A and an ending position (end) 223-A. Marking 221-B is associated with the span of text content that includes the name of one of the parties to the lease agreement ("JAMES SMITH"), with a starting position (start) 222-B and an ending position (end) 223-B. Marking 221-C is associated with the span of text content that includes the address of one of the parties to the lease agreement, with a starting position (start) 222-C and an ending position (end) 223-C. Marking 221-D is associated with the span of text content that includes the state portion of address of one of the parties to the lease agreement, with a starting position (start) 222-D and an ending position (end) 223-D. Notably, marking 221-D is associated with a span of text that is within the span of text associated with marking 221-A (e.g., a nested marking).

As noted above with respect to FIG. 1, marking projection module 100 may use the marking information stored with similar document 220 to identify the locations of markings 221-A, 221-B, 221-C, and 221-B (e.g., the corresponding start and end coordinates for each marking). Once these locations have been identified, marking projection module 100 may use the marking locations in combination with points of mismatch between target document 200 and similar document 220 (e.g., positions where there are differences between the text of the documents) to generate projected markings for the target document 200. This process is described in further detail below with respect to FIG. 2C.

FIG. 2C depicts an example of a modified target document that includes markings based on the markings of similar document 220 of FIG. 2B. The projected markings 231-A, 231-B, 231-C, and 231-D may be generated for target document 200 by marking projection module 100 as described above in FIG. 1. In some implementations, marking projection module 100 may determine a point of mismatch between target document 200 and similar document 220 using the difference between the text content of the two documents. For example, as shown above with respect to FIGS. 2A-2B, the text content of the two documents is identical for the spans that include the content "THIS LEASE AGREEMENT is made as of the". The first difference identified between the two documents (and thus the first point of mismatch) is the beginning of the span of text that includes the date of the agreement in each document (e.g., $12^{th}$ vs. $3^{rd}$ of December).

Marking projection module 100 may then determine whether the point of mismatch is between the starting and ending positions of a marking within the similar document 220. If so, marking projection module 100 may set the starting position of the projected marking in the target document 200 according to the ending location of a preceding span of text that is identical to that of the similar document 220. For example, as noted above, the first point of mismatch between target document 200 and similar document 220 is at the starting position of the text that includes the date. This mismatch occurs between start 222-A and end 223-A (the start and end positions of marking 221-A). Marking projection module 100 may determine that the span of text content in similar document 220 that precedes start 222-A ("THIS LEASE AGREEMENT is made as of the") matches a span of text in the target document 200. Marking projection module 100 may then set a starting position for the projected marking 231-A in marked target document 230 according to the ending location of the matching span of text in the target document. Thus, start 232-A may be set according to the ending location of the text "THIS LEASE AGREEMENT is made as of the".

Marking projection module 100 may then determine the ending position of projected marking 231-A for the target document. Marking projection module 100 may make this determination by identifying a span of text content that follows the ending position of the marking in the similar document 220 (position end 223-A of marking 221-A in FIG. 2B) that matches a span of text in the target document 200. As shown in FIGS. 2A-2B, the span of text ", by and between" follows marking 221-A in similar document 220 and matches a span of text that follows the date text in target document 200. Marking projection module 100 may then set the ending position of the projected marking in the target document according to the starting location of the matching span of text. Thus, end 233-A in FIG. 2C may be set according to the starting location of the text ", by and between".

The above process may be repeated for each of the markings 221-B and 221-C of the similar document 220 to yield projected markings 231-B and 231-C for marked target document 230. In some instances, since the projected markings for the target document are based in part on the points of mismatch between the target and the similar documents, the starting or ending positions of the projected markings may include additional text when compared to the corresponding marking of the similar document. This is illustrated by projected marking 231-B of FIG. 2C. When analyzing marking 221-B of FIG. 2B (the similar document 220), to determine the ending position of marking 231-B of the target document shown FIG. 2C, marking projection module 100 identifies a span of text in the similar document 220 that follows the ending position of marking 221-B in the similar document 220 (position end 223-B in FIG. 2B) and that matches a span of text in the target document 200. As shown in FIGS. 2A-2B, the span of text "whose mailing address is" follows marking 221-B in similar document 220 and matches a span of text in target document 200. Thus, end 233-B in FIG. 2C may be set according to the starting location of "whose mailing address is". This can result in marking 231-B associated with the name of one of the lease participants to include the text "a single man". Notably, while this additional text is incorporated in the marking for the name, this text may be further analyzed in post processing when data is ultimately extracted from marked target document 230. Thus, the projected markings may be more quickly generated for the target document without the overhead of further analysis.

In some implementations, nested markings may be present in similar documents. For example, as shown in FIG. 2B, location of marking 221-D (the state of the Lessor) is nested within the location of marking 221-A (the entire address of the Lessor). In such cases, marking projection module 100 may implement heuristics to determine the context of marking 221-D in relation to marking 221-A in order to generate the corresponding projected marking for the target document (e.g., marking 231-D of FIG. 2C). In an illustrative example, marking projection module 100 determines a location of the second marking 221-D within the similar document 220, where the second marking is associated with a portion of text content of similar document 220 that is located between the starting position (start 222-A) and the ending position (223-A) of marking 221-A (in FIG. 2B). Marking projection module 100 then determines the context of the portion of text associated with marking 221-D ("CA") in view of the portion of text associated with marking 221-A (the entire address). Marking projection module 100 may make this determination by applying semantic analysis, syntactic analysis, structural comparison, contextual comparison, or in any other manner.

Once the context of the nested marking in the similar document has been determined, marking projection module 100 may determine a projected marking for the target document by applying the determined context to text in the target document. For example, as shown in FIG. 2B, marking 221-D is located between the starting position (start 222-C) and ending position (end 223-C) of marking 221-C. Marking projection module 100 determines, that the text content of marking 221-D with respect to the text content of marking 221-C as a whole, is that of the state portion of an address. When generating a corresponding projected marking for marking 221-D, marking projection module 100 may identify the marking associated with the address in the target document (marking 231-C of FIG. 2C), and analyze the text of that marking with respect to the identified context to identify the text that represents the state portion of the address. Thus, the position of marking 231-D may be set to the portion of text content between start 232-C and end 233-C that includes the state portion of the address.

Figure 3:
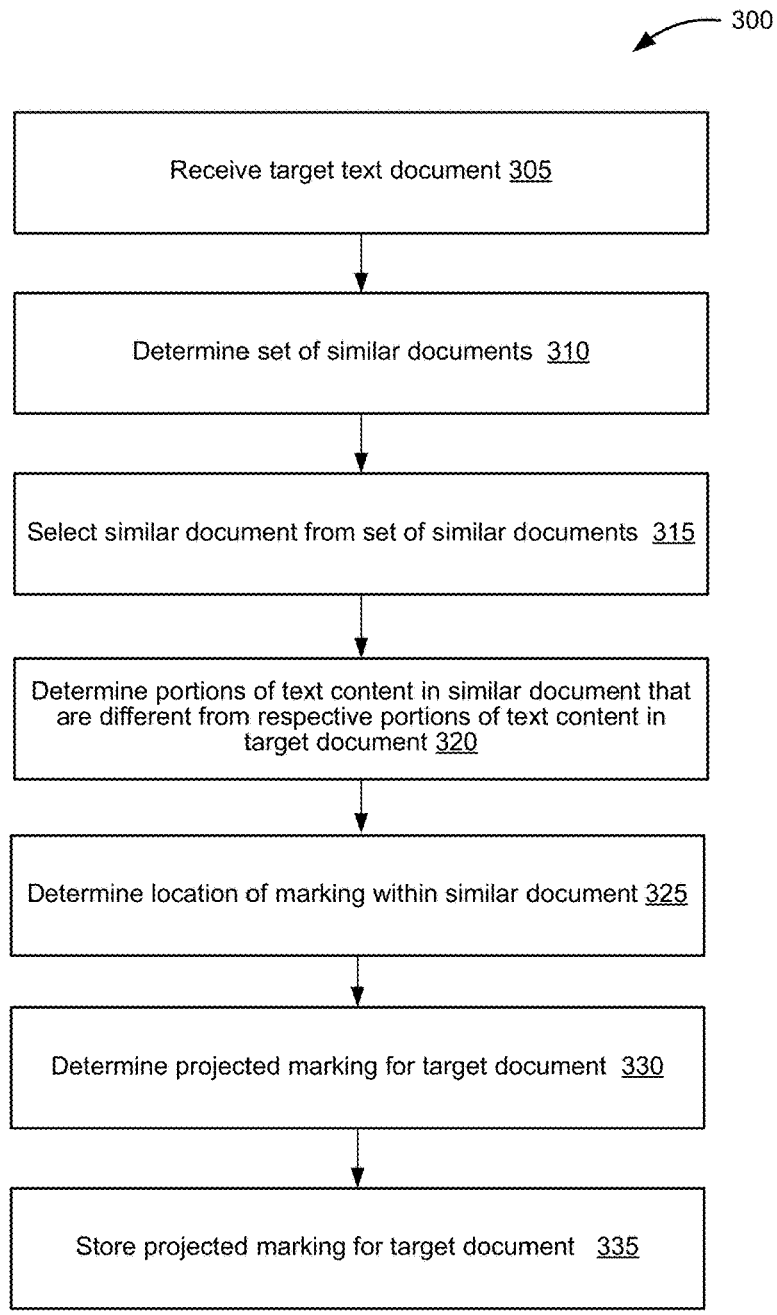
FIG. 3 depicts a flow diagram of a method for generating projected markings for a target document based on similar documents, in accordance with one or more aspects of the present disclosure.
Figure 4:
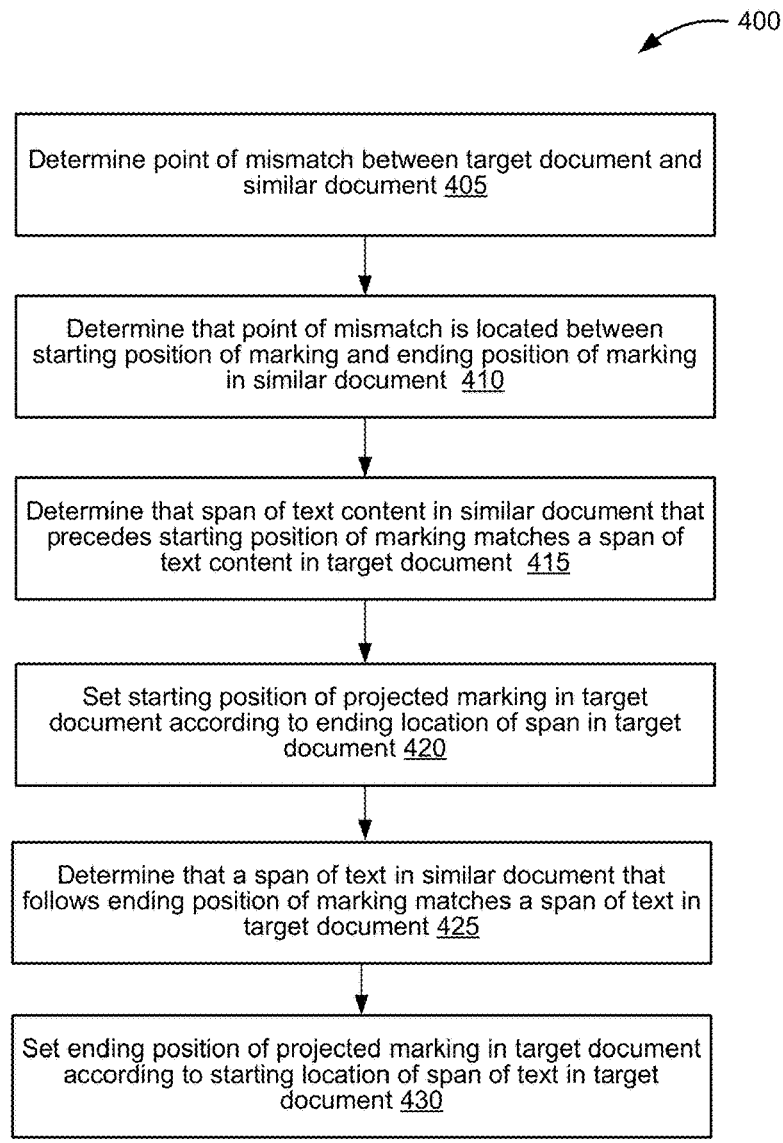
FIG. 4 depicts a flow diagram of a method for determining a projected marking location for a target document based on a similar document, in accordance with one or more aspects of the present disclosure.
Figure 5:
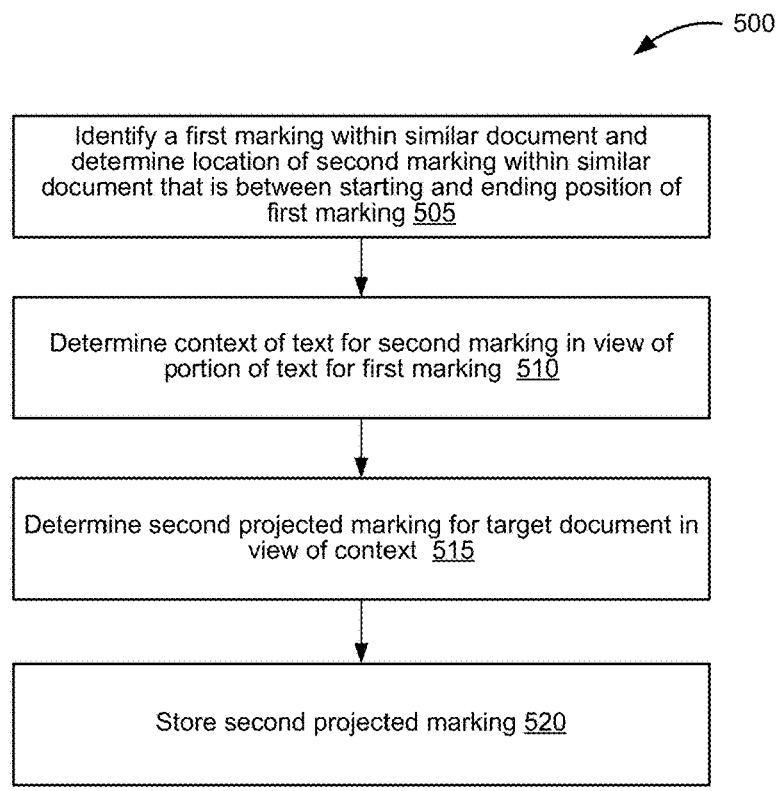
FIG. 5 depicts a flow diagram of a method for determining a nested projected marking for a target document based on context, in accordance with one or more aspects of the present disclosure.

FIGS. 3-5 are flow diagrams of various implementations of methods related to generating projected markings for a target document based on the markings of similar documents. The methods are performed by processing logic that may include hardware (circuitry, dedicated logic, etc.), software (such as is run on a general purpose computer system or a dedicated machine), or a combination of both. The methods and/or each of their individual functions, routines, subroutines, or operations may be performed by one or more processors of a computing device (e.g., computing system 600 of FIG. 6) implementing the methods. In certain implementations, the methods may be performed by a single processing thread. Alternatively, the methods may be performed by two or more processing threads, each thread implementing one or more individual functions, routines, subroutines, or operations of the methods. Some methods may be performed by a marking projection module such as marking projection module 100 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 3 depicts a flow diagram of an example method 300 for generating projected markings for a target document based on similar documents. At block 305 of method 300, processing logic receives a target document comprising text content. At block 310, processing logic determines a set of similar documents, where the set of similar documents are similar to the target document (e.g., the similar documents and the target document share a similar structure, share a particular percentage of similar words, share a particular percentage of similar characters, or the like), and where each similar document of the set of similar documents has a corresponding similarity measurement. In some implementations, processing logic makes this determination using an index of stored documents.

At block 315, processing logic selects a similar document from the set of similar documents determined at block 310. In some implementations, the selected similar document is the most similar to the target document in view of the corresponding similarity measurement associated with the selected similar document. In other embodiments, if more than one most similar document may be selected, then subsequent comparing with the target document for each most similar document may be executed sequentially or concurrently. At block 320, processing logic determines one or more differences between the text content of the target document and the text content of the similar document selected at block 315. In some implementations, processing logic may determine the differences by determining one or more portions of text content in the similar document that are different from respective one or more portions of text content in the target document. For example, processing logic may compare the text of the similar document to the text of the target document to determine the locations of spans of text that are different between the documents, as well as locations of spans of text that are the same in both documents.

At block 325, processing logic determines a location of a marking within the similar document, where the marking is associated with a portion of text content in the similar document. At block 330, processing logic determines a projected marking for the target document. In an illustrative example, processing logic may determine the projected marking as described below with respect to FIG. 4. At block 335, processing logic stores the projected marking for the target document. After block 335, the method of FIG. 3 terminates.

FIG. 4 depicts a flow diagram of an example method 400 for determining a projected marking location for a target document based on a similar document. At block 405 of method 400, processing logic determines a point of mismatch between a target document and a similar document. In some implementations, this determination is made in view of the differences between the text content of the target document and the text content of the similar document. At block 410, processing logic determines that the point of mismatch is located between the starting position of a marking and the ending position of the marking in a similar document.

At block 415, processing logic determines that a span of text content in the similar document that precedes the starting position of the marking matches a span of text content in the target document. At block 420, processing logic sets the starting position of the projected marking in the target document according to the ending location of the span of text in the target document. At block 425, processing logic determines that a span of text in the similar document that follows the ending position of the marking matches a span of text in the target document. At block 430, processing logic sets the ending position of the projected marking in the target document according to the starting location of the matching span of text in the target document identified at block 425. After block 430, the method of FIG. 4 terminates.

Notably, in implementations where more than one most similar document has been selected to determine a projected marking for a target document, the above steps in the method of FIG. 4 may be repeated for each selected most similar document. The projected markings for the target document may be determined using a "voting" process that takes into account locations of common points of text match and text mismatch across each of the most similar documents (e.g., the amount of "overlap" of text match and text mismatch between the target document and the most similar documents). In such cases, the projected marking for the target document may be determined based on a combination of several variants of corresponding markings from the similar documents, where each variant of the marking is a result of comparing one of the selected documents from the set of most similar documents with the target document. To determine starting and ending positions of the combined projected marking, a number of "votes" is calculated for each span of text in the target document that matches a corresponding span of text in the selected most similar documents. Thus, the number of votes may represent the number of most similar documents for which a particular span of text is located within a common interval. The spans having the number of votes of individual markings greater than a threshold value may be used to set the boundaries for the combined projected marking.

FIG. 5 depicts a flow diagram of an example method 500 for determining a nested projected marking for a target document based on context. At block 505 of method 500, processing logic identifies a first marking in the similar document, and determines a location of a second marking within the similar document that is between the starting and ending position of the first marking. At block 510, processing logic determines the context of the portion of text within the second marking in view of the portion of text for the first marking. To make this determination, processing logic analyzes the text for the second marking to determine its meaning in relation to the text for the first marking. For example, if the text for the first marking includes an entire address, and the text for the second marking includes the state portion of that address, processing logic may determine that the context of the text for the second marking is that of a state portion of an address. In some implementations, processing logic may make this determination by applying semantic analysis, syntactic analysis, structural comparison, contextual comparison, or the like.

At block 515, processing logic determines a second projected marking for the target document in view of the context determined at block 510. Processing logic may use the context of the markings in the similar document to identify a similar contextual relationship in the target document. To continue the example noted above, processing logic may first identify a span of text in the target document that includes an address. Subsequently, processing logic may then use the contextual relationship from the similar document (e.g., the state portion of the address) to identify the state portion of the address in the target document. As noted above, processing logic may make this determination by applying semantic analysis, syntactic analysis, structural comparison, contextual comparison, or the like. At block 520, processing logic stores the second projected marking for the target document. After block 520, the method of FIG. 5 terminates.

Figure 6:
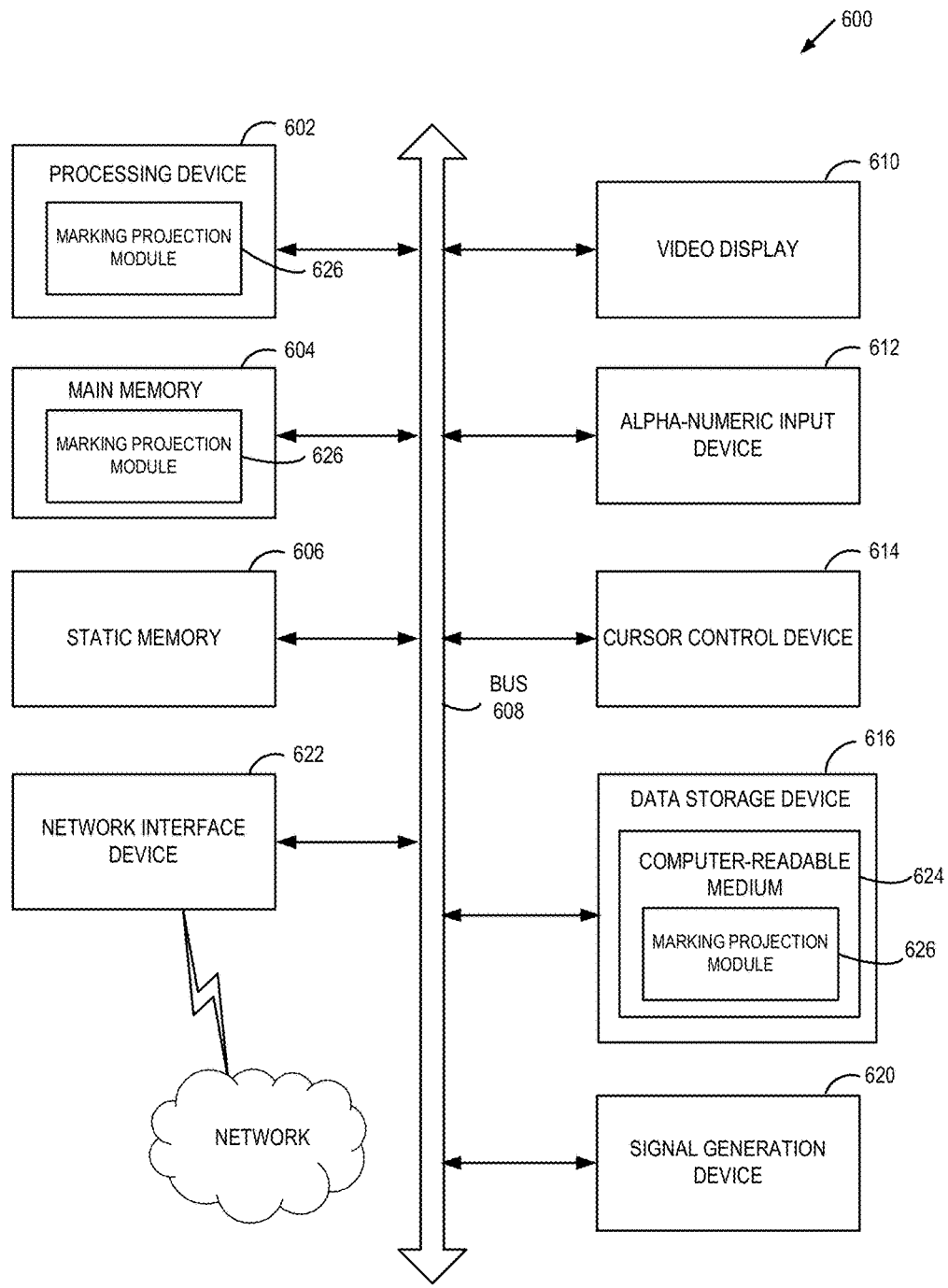
FIG. 6 depicts a block diagram of an illustrative computer system operating in accordance with examples of the present disclosure.

FIG. 6 depicts an example computer system 600 which can perform any one or more of the methods described herein. In one example, computer system 600 may correspond to a computing device capable of executing marking projection module 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute smart document generator module 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 1620 (e.g., a speaker). In one illustrative example, the video display unit 610, the alphanumeric input device 612, and the cursor control device 614 may be combined into a single component or device (e.g., an LCD touch screen).

The data storage device 616 may include a computer-readable medium 624 on which is marking projection module 626 (e.g., corresponding to the methods of FIGS. 3-5, etc.) embodying any one or more of the methodologies or functions described herein. Marking projection module 626 may also reside, completely or at least partially, within the main memory 604 and/or within the processing device 602 during execution thereof by the computer system 600, the main memory 604 and the processing device 602 also constituting computer-readable media. Marking projection module 626 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

receiving, by a processing device, a target document comprising text content;

determining a set of similar documents using an index of stored documents, wherein the set of similar documents are similar to the target document;

selecting a first similar document from the set of similar documents, wherein the first similar document is most similar to the target document;

determining one or more portions of text content in the first similar document that are different from respective one or more portions of text content in the target document;

determining a first location of a first marking within the first similar document, wherein the first marking is associated with a first portion of the one or more different portions of the text content in the first similar document;

determining, by the processing device, a projected marking for the target document in view of one or more differences between the first portion of the text content in the first similar document and a respective portion of the text content in the target document, wherein the projected marking corresponds to the first marking within the first similar document; and storing the projected marking for the target document.

2. The method of claim 1, wherein each similar document of the set of similar documents has a corresponding similarity measurement, and wherein the first similar document is most similar to the target document in view of the corresponding similarity measurement associated with the first similar document.

3. The method of claim 2, wherein selecting the first similar document comprises:

sorting the set of similar documents by similarity measurement; and determining that the similarity measurement for the first similar document meets a threshold value.

4. The method of claim 3 further comprising:

determining that the similarity measurement for the first similar document is greater than the corresponding similarity measurement for each similar document of the set of similar documents.

5. The method of claim 1, wherein determining the first location of the first marking comprises:

determining a starting position of the first marking within the first similar document; and determining an ending position of the first marking within the first similar document.

6. The method of claim 5, wherein determining the projected marking for the target document comprises:

determining a point of mismatch between the target document and the first similar document in view of the one or more portions of text content in the first similar document that are different from respective one or more portions of text content in the target document;

determining that the point of mismatch is located in the first similar document between the starting position of the first marking and the ending position of the first marking;

determining that a first span of text content in the first similar document that precedes the starting position of the first marking matches a second span of text content in the target document; and
setting a starting position of the projected marking in the target document according to an ending location of the second span of text content.

7. The method of claim 6 further comprising:
determining that a third span of text content in the first similar document that follows the ending position of the first marking matches a fourth span of text content in the target document; and
setting an ending position of the projected marking in the target document according to a starting location of the fourth span of text content.

8. The method of claim 1, further comprising:
determining a second location of a second marking within the first similar document, wherein the second marking is associated with a second portion of the text content of the first similar document, and wherein the second location is between the starting position of the first marking and the ending position of the first marking;
determining a context of the second portion of the text content in view of the first portion of the text content;
determining a second projected marking for the target document in view of the context, wherein the second projected marking corresponds to the second marking within the first similar document, and wherein the second projected marking is between the starting position of the projected marking and the ending position of the projected marking; and
storing the second projected marking for the target document.

9. The method of claim 1, further comprising:
selecting one or more additional similar documents from set of similar documents, wherein each of the one or more additional similar documents is most similar to the target document;
determining one or more additional portions of text content in each additional similar document that are different from the respective one or more portions of text content in the target document;
determining locations of an additional marking in each additional similar document, wherein each additional marking corresponds to the first marking within the first similar document, and wherein each additional marking is associated with a portion of the one or more additional different portions of the text content in the respective additional similar document; and
determining a final projected marking for the target document in view of the locations of each additional marking.

10. The method of claim 9, further comprising:
determining a number of additional markings that share a common location;
determining that the number of additional markings that share a common location meets a threshold value; and
determining the final projected marking using the common location.

11. A computing apparatus comprising:
a memory to store instructions; and
a processing device, operatively coupled to the memory, to execute the instructions, wherein the processing device is to:
receive a target document comprising text content;
determine a set of similar documents using an index of stored documents, wherein the set of similar documents are similar to the target document;
select a first similar document from the set of similar documents, wherein the first similar document is most similar to the target document;
determine one or more portions of text content in the first similar document that are different from respective one or more portions of text content in the target document;
determine a first location of a first marking within the first similar document, wherein the first marking is associated with a first portion of the one or more portions of the text content of in first similar document;
determine a projected marking for the target document in view of one or more differences between the first portion of the text content in the first similar document and a respective portion of the text content in the target document, wherein the projected marking corresponds to the first marking within the first similar document; and
store the projected marking for the target document.

12. The computing apparatus of claim 11, wherein each similar document of the set of similar documents has a corresponding similarity measurement, and wherein the first similar document is most similar to the target document in view of the corresponding similarity measurement associated with the first similar document.

13. The computing apparatus of claim 11, wherein to select the first similar document, the processing device is to:
sort the set of similar documents by similarity measurement; and
determine that the similarity measurement for the first similar document meets a threshold value.

14. The computing apparatus of claim 12, wherein the processing device is further to:
determining that the similarity measurement for the first similar document is greater than the corresponding similarity measurement for each similar document of the set of similar documents.

15. The computing apparatus of claim 11, wherein to determine the first location of the first marking, the processing device is further to:
determine a starting position of the first marking within the first similar document; and
determine an ending position of the first marking within the first similar document.

16. The computing apparatus of claim 15, wherein to determine the projected marking for the target document, the processing device is further to:
determine a point of mismatch between the target document and the first similar document in view of the one or more portions of text content in the first similar document that are different from respective one or more portions of text content in the target document;
determine that the point of mismatch is located in the first similar document between the starting position of the first marking and the ending position of the first marking;
determine that a first span of text content in the first similar document that precedes the starting position of the first marking matches a second span of text content in the target document; and
set a starting position of the projected marking in the target document according to an ending location of the second span of text content.

17. The computing apparatus of claim 16, wherein the processing device is further to:
  determine that a third span of text content in the first similar document that follows the ending position of the first marking matches a fourth span of text content in the target document; and
  set an ending position of the projected marking in the target document according to a starting location of the fourth span of text content.

18. The computing apparatus of claim 11, wherein the processing device is further to:
  determine a second location of a second marking within the first similar document, wherein the second marking is associated with a second portion of the text content of the first similar document, and wherein the second location is between the starting position of the first marking and the ending position of the first marking;
  determine a context of the second portion of the text content in view of the first portion of the text content;
  determine a second projected marking for the target document in view of the context, wherein the second projected marking corresponds to the second marking within the first similar document, and wherein the second projected marking is between the starting position of the projected marking and the ending position of the projected marking; and
  store the second projected marking for the target document.

19. The computing apparatus of claim 11, wherein the processing device is further to:
  select one or more additional similar documents from set of similar documents, wherein each of the one or more additional similar documents is most similar to the target document;
  determine one or more additional portions of text content in each additional similar document that are different from the respective one or more portions of text content in the target document;
  determine locations of an additional marking in each additional similar document, wherein each additional marking corresponds to the first marking within the first similar document, and wherein each additional marking is associated with a portion of the one or more additional different portions of the text content in the respective additional similar document; and
  determine a final projected marking for the target document in view of the locations of each additional marking.

20. The computing apparatus of claim 19, wherein the processing device is further to:
  determine a number of additional markings that share a common location;
  determine that the number of additional markings that share a common location meets a threshold value; and
  determine the final projected marking using the common location.

21. A non-transitory computer readable storage medium, having instructions stored therein, which when executed by a processing device of a computer system, cause the processing device to perform operations comprising:
  receiving, by the processing device, a target document comprising text content;
  determining a set of similar documents using an index of stored documents, wherein the set of similar documents are similar to the target document;
  selecting a first similar document from the set of similar documents, wherein the first similar document is most similar to the target document;
  determining one or more portions of text content in the first similar document that are different from respective one or more portions of text content in the target document;
  determining a first location of a first marking within the first similar document, wherein the first marking is associated with a first portion of the one or more different portions of the text content in the first similar document;
  determining, by the processing device, a projected marking for the target document in view of one or more differences between the first portion of the text content in the first similar document and a respective portion of the text content in the target document, wherein the projected marking corresponds to the first marking within the first similar document; and
  storing the projected marking for the target document.

22. The non-transitory computer readable storage medium of claim 21, wherein each similar document of the set of similar documents has a corresponding similarity measurement, and wherein the first similar document is most similar to the target document in view of the corresponding similarity measurement associated with the first similar document.

23. The non-transitory computer readable storage medium of claim 21, wherein selecting the first similar document comprises:
  sorting the set of similar documents by similarity measurement; and
  determining that the similarity measurement for the first similar document meets a threshold value.

24. The non-transitory computer readable storage medium of claim 23, the operations further comprising:
  determining that the similarity measurement for the first similar document is greater than the corresponding similarity measurement for each similar document of the set of similar documents.

25. The non-transitory computer readable storage medium of claim 21, the operations further comprising:
  determining a starting position of the first marking within the first similar document; and
  determining an ending position of the first marking within the first similar document.

26. The non-transitory computer readable storage medium of claim 25, wherein determining the projected marking for the target document comprises:
  determining a point of mismatch between the target document and the first similar document in view of the one or more portions of text content in the first similar document that are different from respective one or more portions of text content in the target document;
  determining that the point of mismatch is located in the first similar document between the starting position of the first marking and the ending position of the first marking;
  determining that a first span of text content in the first similar document that precedes the starting position of the first marking matches a second span of text content in the target document; and
  setting a starting position of the projected marking in the target document according to an ending location of the second span of text content.

27. The non-transitory computer readable storage medium of claim 26, the operations further comprising:

determining that a third span of text content in the first similar document that follows the ending position of the first marking matches a fourth span of text content in the target document; and setting an ending position of the projected marking in the target document according to a starting location of the fourth span of text content.

28. The non-transitory computer readable storage medium of claim 21, the operations further comprising:

determining a second location of a second marking within the first similar document, wherein the second marking is associated with a second portion of the text content of the first similar document, and wherein the second location is between the starting position of the first marking and the ending position of the first marking;

determining a context of the second portion of the text content in view of the first portion of the text content;

determining a second projected marking for the target document in view of the context, wherein the second projected marking corresponds to the second marking within the first similar document, and wherein the second projected marking is between the starting position of the projected marking and the ending position of the projected marking; and storing the second projected marking for the target document.

29. The non-transitory computer readable storage medium of claim 21, the operations further comprising:

select one or more additional similar documents from set of similar documents, wherein each of the one or more additional similar documents is most similar to the target document;

determine one or more additional portions of text content in each additional similar document that are different from the respective one or more portions of text content in the target document;

determine locations of an additional marking in each additional similar document, wherein each additional marking corresponds to the first marking within the first similar document, and wherein each additional marking is associated with a portion of the one or more additional different portions of the text content in the respective additional similar document; and determine a final projected marking for the target document in view of the locations of each additional marking.

30. The non-transitory computer readable storage medium of claim 21, the operations further comprising:

determine a number of additional markings that share a common location;

determine that the number of additional markings that share a common location meets a threshold value; and determine the final projected marking using the common location.

* * * * *